US011431056B2

(12) United States Patent
Probert et al.

(10) Patent No.: US 11,431,056 B2
(45) Date of Patent: Aug. 30, 2022

(54) SYSTEMATIC LAYOUTS FOR ELECTRIFIED VEHICLE TRACTION BATTERY PACKS

(71) Applicant: FORD GLOBAL TECHNOLOGIES, LLC, Dearborn, MI (US)

(72) Inventors: Brad Warren Probert, Farmington Hills, MI (US); Micah Smith, Detroit, MI (US); Eric Yoo, Allen Park, MI (US); Tarek Obeid, Dearborn Heights, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 166 days.

(21) Appl. No.: 16/682,404

(22) Filed: Nov. 13, 2019

(65) Prior Publication Data

US 2021/0143378 A1 May 13, 2021

(51) Int. Cl.
*H01M 50/20* (2021.01)
*H01M 10/6568* (2014.01)
*H01M 10/613* (2014.01)
*H01M 10/6556* (2014.01)
*H01M 10/625* (2014.01)
*B60L 50/64* (2019.01)
*B60L 58/26* (2019.01)
*H01M 10/6554* (2014.01)

(52) U.S. Cl.
CPC .............. *H01M 50/20* (2021.01); *B60L 50/64* (2019.02); *B60L 58/26* (2019.02); *H01M 10/613* (2015.04); *H01M 10/625* (2015.04); *H01M 10/6554* (2015.04); *H01M 10/6556* (2015.04); *H01M 10/6568* (2015.04); *H01M 2220/20* (2013.01)

(58) Field of Classification Search
CPC ...... B60L 50/64; B60L 58/26; H01M 10/613; H01M 10/625; H01M 10/6554; H01M 10/6556; H01M 10/6568; H01M 2220/20; H01M 50/20
See application file for complete search history.

(56) References Cited

U.S. PATENT DOCUMENTS

| 10,312,558 | B2 | 6/2019 | Yang | |
| 2013/0004806 | A1* | 1/2013 | Wang | B60L 50/64 |
| | | | | 429/50 |
| 2017/0229690 | A1* | 8/2017 | Marpu | H01M 50/20 |
| 2018/0013110 | A1 | 1/2018 | Wuensche et al. | |
| 2018/0337377 | A1* | 11/2018 | Stephens | B60L 50/64 |

FOREIGN PATENT DOCUMENTS

| CN | 206441787 U | 8/2017 |
| CN | 108172732 A | 6/2018 |
| DE | 102015204216 A1 | 9/2016 |

* cited by examiner

*Primary Examiner* — Adam A Arciero
(74) *Attorney, Agent, or Firm* — David B. Kelley; Carlson, Gaskey & Olds, P.C.

(57) ABSTRACT

This disclosure details exemplary battery pack designs for use in electrified vehicles. Exemplary battery packs may include an enclosure assembly that houses one or more battery arrays. The battery arrays may be efficiently arranged relative to one another inside the enclosure assembly to establish an open channel within the enclosure assembly. Coolant lines and/or wiring lines may be positioned within and/or routed through the open channel in order to maximize battery internal component volume without increasing the overall footprint of the enclosure assembly.

19 Claims, 5 Drawing Sheets

SYSTEMATIC LAYOUTS FOR ELECTRIFIED VEHICLE TRACTION BATTERY PACKS

TECHNICAL FIELD

This disclosure relates to electrified vehicle traction battery packs, and more particularly to efficient battery pack internal layouts for maximizing battery internal component volume.

BACKGROUND

Electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. An enclosure assembly of the battery pack houses a plurality of battery internal components including, but not limited to, battery arrays and battery electronic components. An inefficient layout of these components inside the enclosure assembly can unnecessarily increase the weight and cost of the battery pack.

SUMMARY

A battery pack according to an exemplary aspect of the present disclosure includes, among other things, an enclosure assembly, a first battery array housed within the enclosure assembly, a second battery array housed within the enclosure assembly, a battery internal structure disposed between the first battery array and the second battery array within the enclosure assembly, a coolant line routed over the structural cross-member, and a wiring line routed over the coolant line.

In a further non-limiting embodiment of the foregoing battery pack, the enclosure assembly extends along a central longitudinal axis, and the battery internal structure extends perpendicularly relative to the central longitudinal axis.

In a further non-limiting embodiment of either of the foregoing battery packs, the battery internal structure is a rigid cross member that connects between a pair of longitudinally extending side walls of the enclosure assembly.

In a further non-limiting embodiment of any of the foregoing battery packs, a third battery array is spaced apart from the first battery array on a first side of the battery internal structure, a fourth battery array is spaced apart from the second battery array on a second side of the battery internal structure, and an open channel extends between the first and third battery arrays and the second and fourth battery arrays.

In a further non-limiting embodiment of any of the foregoing battery packs, the enclosure assembly extends along a central longitudinal axis, and the central longitudinal axis bisects the open channel.

In a further non-limiting embodiment of any of the foregoing battery packs, the first and third battery arrays share a first heat exchanger plate and the second and fourth battery arrays share a second heat exchanger plate.

In a further non-limiting embodiment of any of the foregoing battery packs, the first heat exchange plate includes a first port and the second heat exchanger plate includes a second port. The coolant line is connected to the first and second ports.

In a further non-limiting embodiment of any of the foregoing battery packs, a thermal interface material (TIM) is disposed between the first and third battery arrays and the first heat exchanger plate.

In a further non-limiting embodiment of any of the foregoing battery packs, the coolant line and the wiring line are routed within the open channel.

In a further non-limiting embodiment of any of the foregoing battery packs, a mounting clamp includes a base mounted to the battery internal structure, a first arm in contact with the first battery array, and a second arm in contact with the second battery array.

In a further non-limiting embodiment of any of the foregoing battery packs, the enclosure assembly extends along a central longitudinal axis, and the first and second battery arrays extend along axes that are perpendicular to the central longitudinal axis.

In a further non-limiting embodiment of any of the foregoing battery packs, the wiring line is a battery internal wiring line or a high voltage wiring harness.

A battery pack according to another exemplary aspect of the present disclosure includes, among other things, an enclosure assembly including a tray and a cover, a heat exchanger plate positioned against a floor of the tray, and a first row of battery arrays positioned in proximity to the heat exchanger plate. The first row of battery arrays includes a first battery array and a second battery array spaced apart from the first battery array. An open channel extends between the first battery array and the second battery array and between the cover and a section of the heat exchanger plate that is disposed between the first battery array and the second battery array. A coolant line is routed within the open channel.

In a further non-limiting embodiment of the foregoing battery pack, the coolant line is connected to an inlet port or an outlet port of the heat exchanger plate.

In a further non-limiting embodiment of either of the foregoing battery packs, the enclosure assembly extends along a central longitudinal axis, and the central longitudinal axis bisects the open channel.

In a further non-limiting embodiment of any of the foregoing battery packs, a second heat exchanger plate is positioned against the floor of the tray, a second row of battery arrays are positioned in proximity to the second heat exchanger plate, and a battery internal structure is disposed between the first and second rows of battery arrays.

In a further non-limiting embodiment of any of the foregoing battery packs, a length of the open channel extends along a central longitudinal axis of the enclosure assembly, and the battery internal structure extends along an axis that is transverse to the central longitudinal axis.

In a further non-limiting embodiment of any of the foregoing battery packs, the coolant line is routed over the battery internal structure within the open channel.

In a further non-limiting embodiment of any of the foregoing battery packs, a wiring line is routed over top of the coolant line within the open channel.

In a further non-limiting embodiment of any of the foregoing battery packs, the wiring line is a battery internal wiring line or a high voltage wiring harness.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. Exemplary battery packs may include an enclosure assembly that houses one or more battery arrays. The battery arrays may be efficiently arranged relative to one another inside the enclosure assembly to establish an open channel within the enclosure assembly. Coolant lines and/or wiring lines may be positioned within and/or routed through the open channel in order to maximize battery internal component volume without increasing the overall footprint of the enclosure assembly. These and other features are discussed in greater detail in the following paragraphs of this detailed description.

Figure 1:
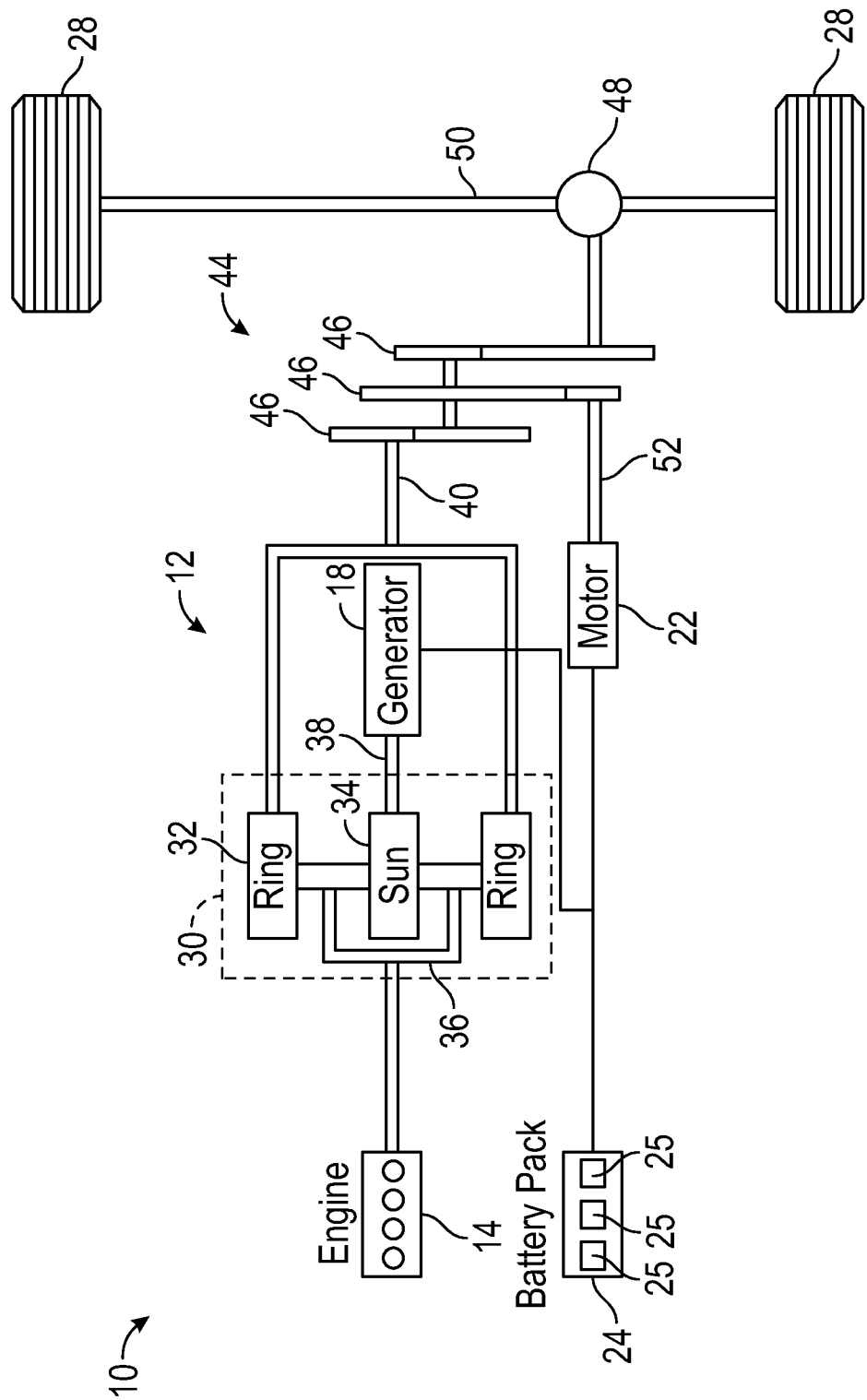
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
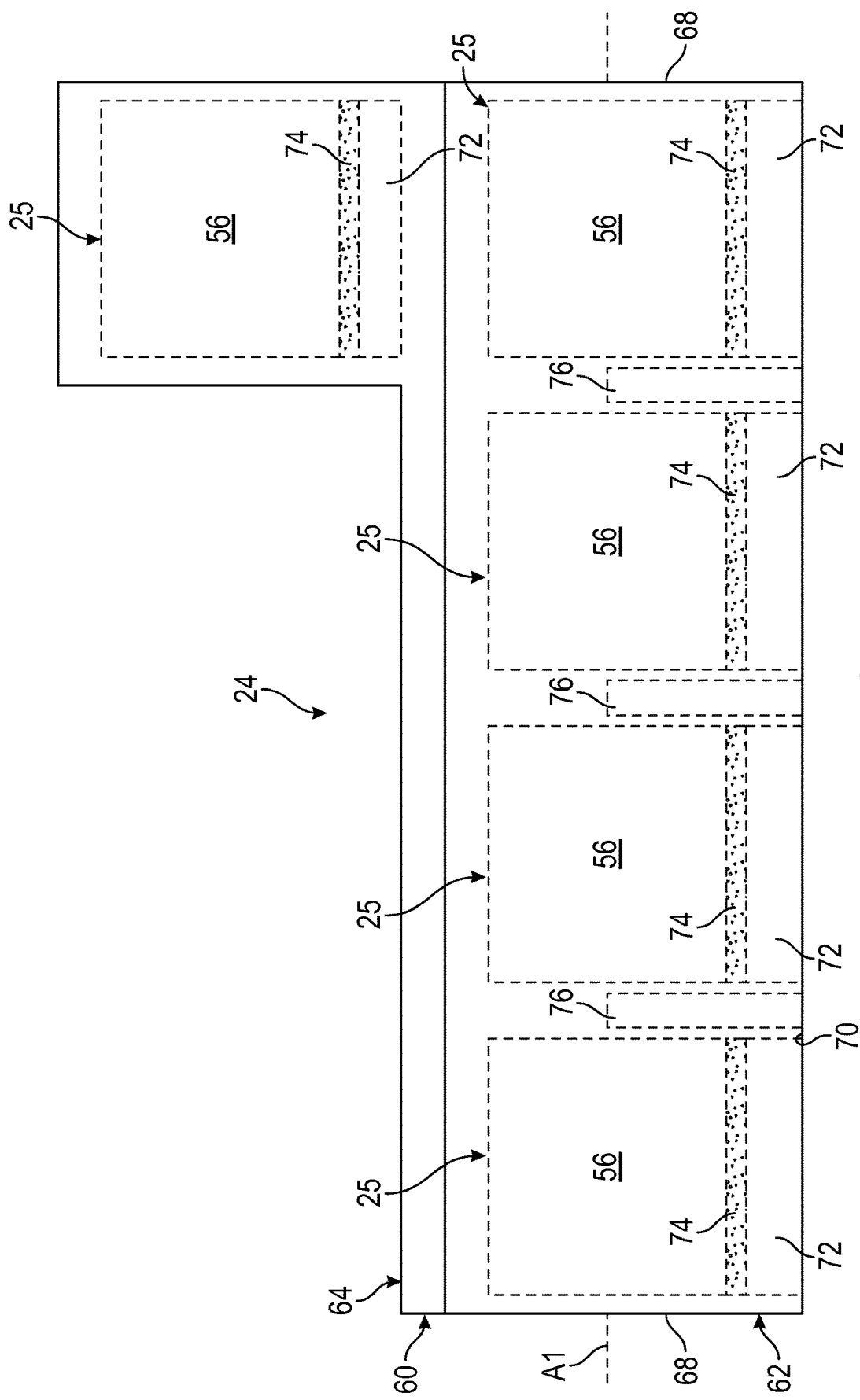
FIG. 2 illustrates a battery pack of an electrified vehicle.
Figure 3:
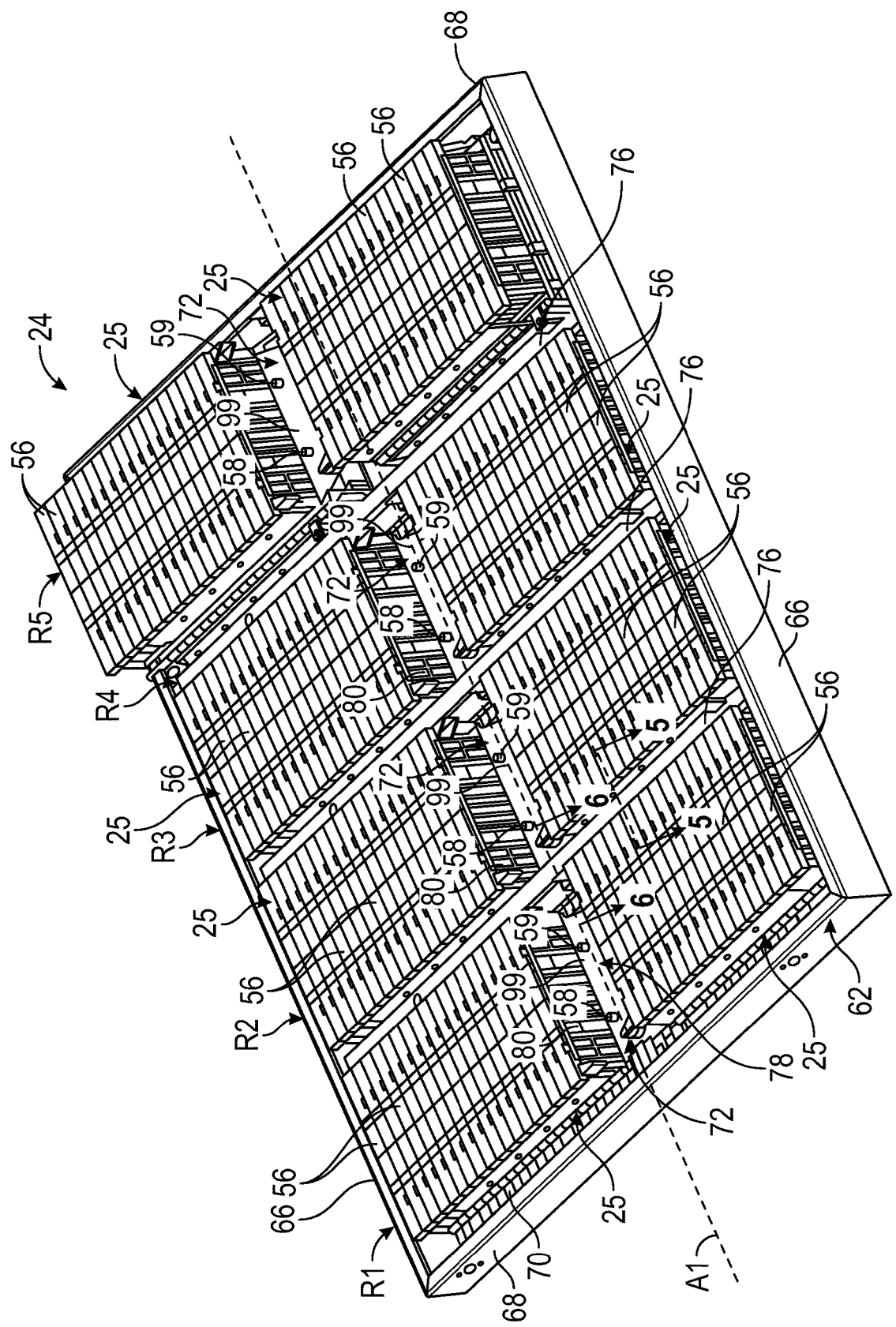
FIG. 3 is a perspective view of the battery pack of FIG. 2 with select portions removed in order to better illustrate an interior of the battery pack.

FIGS. 2 and 3 illustrate a battery pack 24 that can be employed within an electrified vehicle, such as the electrified vehicle 12 of FIG. 1. A highly schematic front view of the battery pack 24 is shown in FIG. 2, and a perspective view of the battery pack 24 is shown in FIG. 3. Portions (e.g., a cover 64) of the battery pack 24 are removed in FIG. 3 in order to better visualize its internal contents.

The battery pack 24 may house a plurality of battery cells 56 that store energy for powering various electrical loads of the electrified vehicle 12. The battery pack 24 could employ any number of battery cells 56 within the scope of this disclosure. Accordingly, this disclosure is not limited to the exact configuration shown in FIGS. 2-3.

The battery cells 56 may be stacked side-by-side along one or more stack axes to construct groupings of battery cells 56, sometimes referred to as "cell stacks" or "cell arrays." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56 of each grouping, along with any support structures (e.g., array frames, spacers, rails, walls, plates, bindings, etc.), may collectively be referred to as a battery assembly or a battery array 25. The battery pack 24 depicted in FIG. 3 includes four rows (labeled as rows R1, R2, R3, and R4) of two laterally adjacent battery arrays 25 for a total of eight battery arrays 25. An additional row R5 (i.e., a second tier) of two adjacent battery arrays 25 may be stacked on top of at least one of the rows R1-R4 (as illustrated, row R5 is stacked on top of row R4) for a total of ten battery arrays 25. However, the battery pack 24 could include a greater or fewer number of battery arrays and still fall within the scope of this disclosure.

An enclosure assembly 60 may house each battery array 25 of the battery pack 24. The enclosure assembly 60 may extend along a central longitudinal axis A1 and may include a tray 62 and a cover 64. The enclosure assembly 60 may include any size, shape, and configuration within the scope of this disclosure.

The tray 62 may include a pair of longitudinally extending side walls 66, a pair of laterally extending side walls 68, and a floor 70 disposed between the pair of longitudinally extending side walls 66 and the pair of laterally extending side walls 68. The longitudinally extending side walls 66 may extend in parallel with the central longitudinal axis A1, and the laterally extending side walls 68 may extend generally perpendicular to the central longitudinal axis A1. When mounted to the electrified vehicle 12, the longitudinally extending side walls 66 of the tray 62 extend in parallel with a front-to-rear length of the electrified vehicle 12, and the laterally extending side walls 68 extend in parallel with cross-width of the electrified vehicle 12.

In an embodiment, the enclosure assembly 60 is a sealed enclosure. For example, during assembly, the battery arrays 25 may be arranged relative to one another within the tray 62, and the cover 64 may then be fixedly secured to the tray 62 to seal the battery arrays 25 therein.

Each row R1-R4 of battery arrays 25 may include a heat exchanger plate 72, which is sometimes referred to as a cold plate or cold plate assembly. Therefore, in an exemplary embodiment, the two battery arrays 25 of each row R1-R5 share a common heat exchanger plate 72. The battery arrays 25 of each row R1-R5 may be positioned relative to the heat exchanger plate 72 such that the battery cells 56 are either in direct contact with or in close proximity to their respective heat exchanger plate 72. In an embodiment, the heat exchanger plates 72 are positioned against the floor 70 of the tray 62, and the battery arrays 25 are positioned on top of the heat exchanger plates 72.

In another embodiment, a thermal interface material (TIM) 74 (schematically shown in FIG. 2) may optionally be positioned between the battery arrays 25 and the heat exchanger plates 72 such that exposed surfaces of the battery cells 56 are in direct contact with the TIM 74. The TIM 74 maintains thermal contact between the battery cells 56 and the heat exchanger plates 72, thereby increasing the thermal conductivity between these neighboring components during heat transfer events. The TIM 74 may be made of any known thermally conductive material. In an embodiment, the TIM 74 includes an epoxy resin. In another embodiment, the TIM 74 includes a silicone based material. Other materials, including but not limited to thermal greases, may alternatively or additionally make up the TIM 74.

The heat exchanger plates 72 may be part of a liquid cooling system that is configured for thermally managing the battery cells 56 of each battery array 25. For example, heat may be generated and released by the battery cells 56 during charging operations, discharging operations, extreme ambient conditions, or other conditions. It may be desirable to remove the heat from the battery arrays 25 to improve capacity, life, and performance of the battery cells 56. The heat exchanger plates 72 are configured to conduct the heat out of the battery cells 56. In other words, the heat exchanger plates 72 may operate as heat sinks for removing heat from the heat sources (i.e., the battery cells 56). The heat exchanger plates 72 could alternatively be employed to heat the battery cells 56, such as during extremely cold ambient conditions.

In an embodiment, each heat exchanger plate 72 includes an inlet port 58 and an outlet port 59. The inlet port 58 and outlet port 59 may protrude outwardly from a section 99 of the heat exchanger plate 72 that extends between the adjacent battery arrays 25 of each row R1-R5. A liquid, such a coolant, may be communicated into the heat exchanger plates 72 through the inlet ports 58 and may be expelled from the heat exchanger plates 72 through the outlet ports 59.

Figure 4:
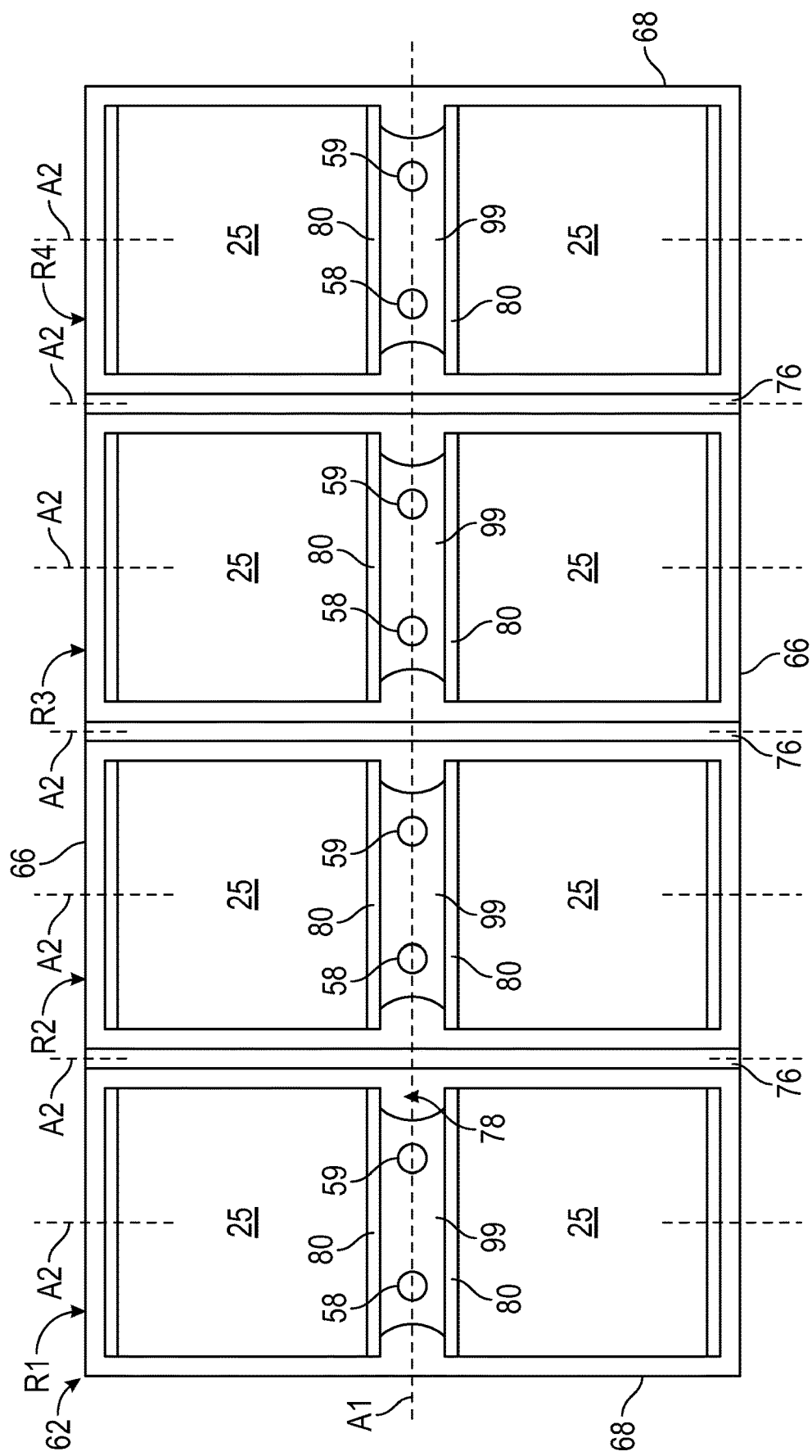
FIG. 4 is a top view of the battery pack of FIG. 2.

Referring now primarily to FIGS. 3-4, a battery internal structure 76, such as a relatively rigid cross member, may be positioned between each adjacent row of battery arrays 25. In general, the battery internal structures 76 add rigidity to the battery pack 24 and, as further discussed below with respect to FIG. 5, establish mounting points for securing the battery arrays 25 relative to the tray 62.

In an embodiment, one battery internal structure 76 is disposed between the rows R1 and R2 of battery arrays 25, another battery internal structure 76 is disposed between the rows R2 and R3, and yet another battery internal structure 76 is disposed between the rows R3 and R4 for a total of three battery internal structures 76 provided within the enclosure assembly 60. However, the total number of battery internal structures 76 provided inside the enclosure assembly 60 is not intended to limit this disclosure.

The battery internal structures 76 may connect between the longitudinally extending side walls 66 of the tray 62 and therefore are arranged, in the illustrated embodiment, in a cross-vehicle orientation. In an embodiment, both the battery arrays 25 and the battery internal structures 76 extend along axes A2 (see FIG. 4) that are generally perpendicular to the central longitudinal axis A1 of the enclosure assembly 60.

The adjacent battery arrays 25 of reach row R1-R4 may be spaced apart from one another to establish an open channel 78 that extends along a center of the tray 62. The open channel 78 may extend horizontally between end plates 80 of the adjacent battery arrays 25 and may extend vertically between upper surfaces 82 of the heat exchanger plates 72 and an internal surface 84 of the cover 64 (see, e.g., FIG. 6). In an embodiment, the open channel 78 extends along the central longitudinal axis A1 such that a centerline axis of the open channel 78 is coincident with the central longitudinal axis A1. In another embodiment, the central longitudinal axis A1 bisects the open channel 78. The inlet ports 58 and outlet ports 59 of the heat exchanger plates 72 and portions of the battery internal structures 76 may extend within the open channel 78 but do not completely block the open channel 78 because these structures are shorter than the battery arrays 25. As is further discussed below with respect to FIG. 6, various additional battery internal components can be routed through the open channel 78 in order to better utilize this space for increasing the overall packaging efficiency of the battery pack 24.

Figure 5:
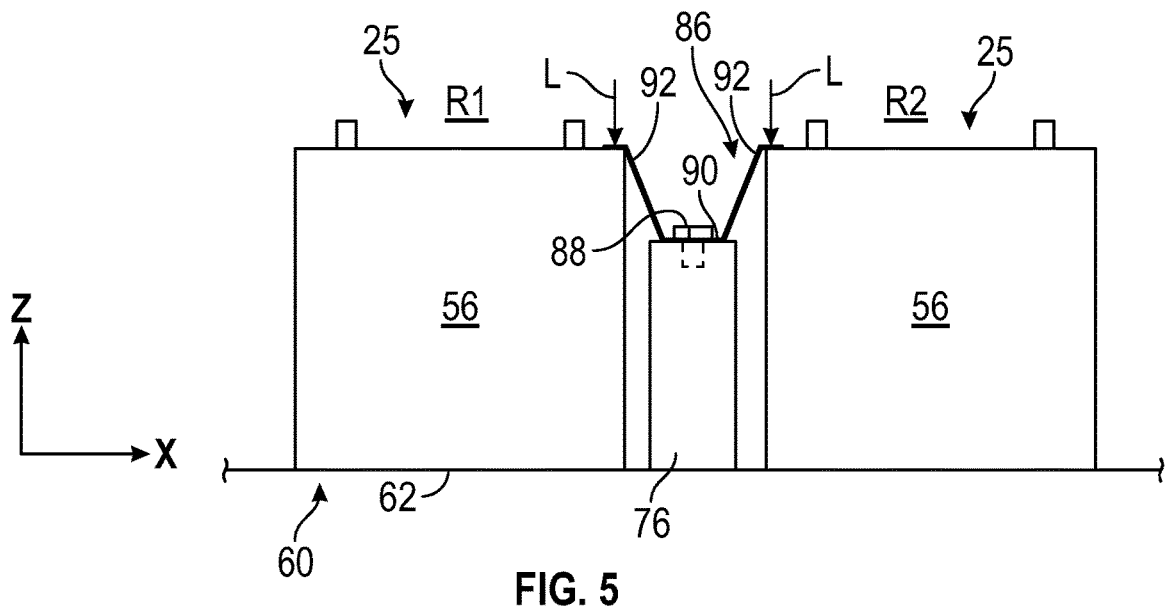
FIG. 5 is a cross sectional view through section 5-5 of FIG. 3.

Referring to FIG. 5, the battery internal structures 76 may provide a mounting surface for mounting the battery arrays 25 relative to the tray 62 of the enclosure assembly 60. This mounting connection can be achieved by using one or more mounting clamps 86 that may be positioned between adjacent battery arrays 25 of adjacent rows R1-R4.

The mounting clamp 86 may be configured to apply clamping loads L for retaining the battery arrays 25 relative to the enclosure assembly 60. In an embodiment, each mounting clamp 86 applies the clamping loads L in a vertical direction (i.e., along a z-axis relative to the battery pack 24). The mounting clamps 86 may therefore resist movement of the battery arrays 25 in the z-axis direction to retain the battery arrays 25 relative to the tray 62 of the enclosure assembly 60.

In an embodiment, the mounting clamps 86 are made of a plastic materials, such as nylon. In another embodiment, the mounting clamps 86 are made of a metallic material, such as steel. Other materials are also contemplated within the scope of this disclosure.

Each mounting clamp 86 may be fixedly secured to one of the battery internal structures 76. One or more fasteners 88, such as threaded fasteners, may be inserted through a base 90 of the mounting clamp 86 and into the battery internal structure 76 for retaining the battery arrays 25 within the enclosure assembly 60. Arms 92 that extend from the base 90 of the mounting clamp 86 may or may not be fixedly secured to either of the battery arrays 25. In either case, the mounting clamp 86 is designed to maintain the clamping loads relative to top surfaces of the battery arrays 25.

Figure 6:
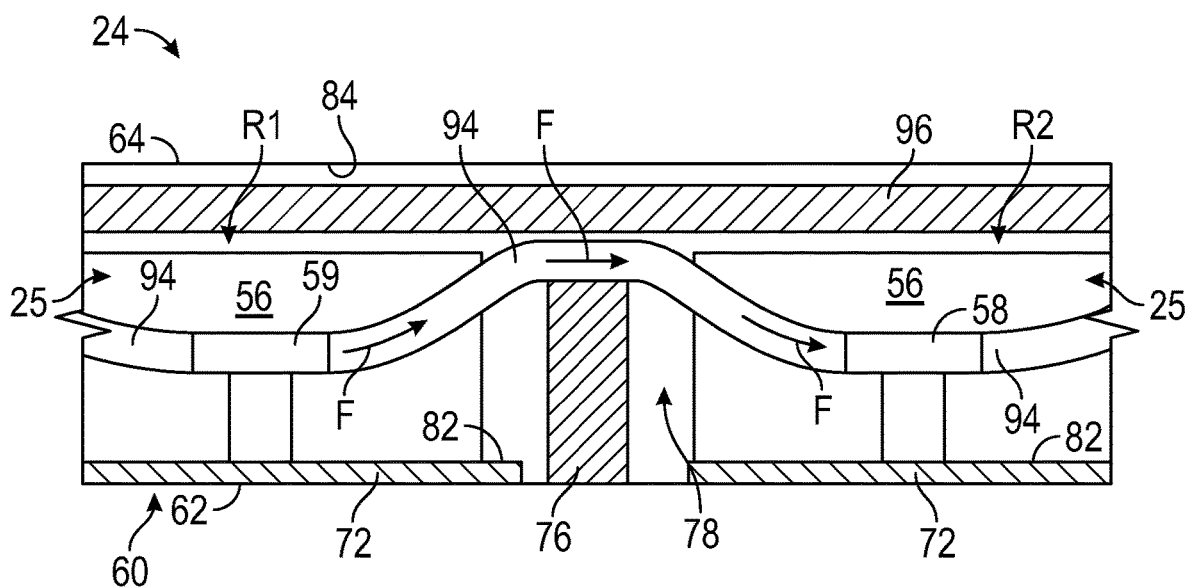
FIG. 6 is a cross-sectional view through section 6-6 of FIG. 3.

FIG. 6 is a cross-sectional view through section 6-6 of FIG. 3 and illustrates portions of the open channel 78 of the enclosure assembly 60 in cross-section. One or more coolant lines 94 may be routed through the space established by the open channel 78. The total number of coolant lines 94 that are routed within the open channel 78 are not intended to limit this disclosure. The coolant line 94 may be routed over top of the battery internal structure 76 within the open channel 78.

In an embodiment, one of the coolant lines 94 may connect between an outlet port 59 of the heat exchanger plate 72 (i.e., a first heat exchanger plate) of the row R1 of battery arrays 25 and an inlet port 58 of the heat exchanger plate 72 (i.e., a second heat exchanger plate) of the row R2 of battery arrays 25 in order to fluidly connect the heat exchanger plates 72. A fluid F may be communicated between the heat exchanger plates 72 within the coolant line 94 for thermally managing the battery cells 56 of the battery arrays 25.

One or more wiring lines 96 may also be routed within the open channel 78. The total number of wiring lines 96 that are routed within the open channel 78 are not intended to limit this disclosure. The wiring lines 96 may be routed within a portion of the open channel 78 that extends between upper surfaces of the battery arrays 25 and the internal surface 84 of the cover 64 of the enclosure assembly 60. Therefore, in this embodiment, the wiring lines 96 are routed over top of the coolant lines 94.

The wiring lines 96 may include any type of battery wiring. In an embodiment, the wiring lines 96 are battery internal wiring lines that are connected to a battery energy control module and/or a battery electronic controller for monitoring the health of the battery cells 56 of the battery arrays 25. In another embodiment, the wiring line 96 is a high voltage wiring harness for connecting the battery pack 24 to a high voltage device, such as an electric motor or generator of the electrified vehicle 12.

The exemplary battery packs of this disclosure incorporate efficient internal layouts for maximizing battery internal component volume without increasing the overall size of the battery pack. The efficient internal layouts incorporate strategically positioned battery internal hardware for establishing an open channel through which various additional battery internal components can be routed. The efficient internal layouts reduce weight and costs associated with the battery pack, thereby resulting in improved electrified vehicle performance, driving range, and customer satisfaction.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   an enclosure assembly;
   a first battery array housed within the enclosure assembly;
   a second battery array housed within the enclosure assembly;
   a battery internal structure disposed between the first battery array and the second battery array within the enclosure assembly;
   a coolant line routed over the battery internal structure; and
   a wiring line routed over the coolant line.

2. The battery pack as recited in claim 1, wherein the enclosure assembly extends along a central longitudinal axis, and the battery internal structure extends perpendicularly relative to the central longitudinal axis.

3. The battery pack as recited in claim 1, wherein the battery internal structure is a rigid cross member that connects between a pair of longitudinally extending side walls of the enclosure assembly.

4. The battery pack as recited in claim 1, comprising:
a third battery array spaced apart from the first battery array on a first side of the battery internal structure;
a fourth battery array spaced apart from the second battery array on a second side of the battery internal structure; and
an open channel extending between the first and third battery arrays and the second and fourth battery arrays.

5. The battery pack as recited in claim 4, wherein the enclosure assembly extends along a central longitudinal axis, and the central longitudinal axis bisects the open channel.

6. The battery pack as recited in claim 4, wherein the first and third battery arrays share a first heat exchanger plate and the second and fourth battery arrays share a second heat exchanger plate.

7. The battery pack as recited in claim 6, wherein the first heat exchange plate includes a first port and the second heat exchanger plate includes a second port, wherein the coolant line is connected to the first and second ports.

8. The battery pack as recited in claim 6, comprising a thermal interface material (TIM) disposed between the first and third battery arrays and the first heat exchanger plate.

9. The battery pack as recited in claim 4, wherein the coolant line and the wiring line are routed within the open channel.

10. The battery pack as recited in claim 1, comprising a mounting clamp that includes a base mounted to the battery internal structure, a first arm in contact with the first battery array, and a second arm in contact with the second battery array.

11. The battery pack as recited in claim 1, wherein the enclosure assembly extends along a central longitudinal axis, and the first and second battery arrays extend along axes that are perpendicular to the central longitudinal axis.

12. The battery pack as recited in claim 1, wherein the wiring line is a battery internal wiring line or a wiring harness.

13. The battery pack as recited in claim 1, comprising an open channel extending between the first battery array and the second battery array and between the enclosure assembly and a section of a heat exchanger plate that extends between the first battery array and the second battery array.

14. The battery pack as recited in claim 13, wherein the coolant line is connected to an inlet port or an outlet port of the heat exchanger plate.

15. The battery pack as recited in claim 13, wherein the enclosure assembly extends along a central longitudinal axis, and further wherein the central longitudinal axis bisects the open channel.

16. The battery pack as recited in claim 13, wherein the first battery array and the second battery array are part of a first row of battery arrays, and further comprising a second row of battery arrays positioned adjacent to the first row of battery arrays.

17. The battery pack as recited in claim 16, wherein the battery internal structure extends between the first and second rows of battery arrays.

18. The battery pack as recited in claim 13, wherein the coolant line is routed over the battery internal structure within the open channel.

19. The battery pack as recited in claim 13, wherein the wiring line is routed over top of the coolant line within the open channel.

* * * * *